United States Patent [19]
Weder

[11] Patent Number: 5,664,675
[45] Date of Patent: Sep. 9, 1997

[54] WRAPPING MATERIAL HAVING A COLD SEAL ADHESIVE FOR WRAPPING FLORAL GROUPINGS AND METHODS

[75] Inventor: Donald E. Weder, Highland, Ill.

[73] Assignee: Southpac Trust International, Inc.; not individually, but as trustee of The Family Trust U/T/A dated December 8, 1995, Charles A. Codding, Authorized Signatory for Southpac Trust International, Inc. trustee

[21] Appl. No.: 470,516

[22] Filed: Jun. 6, 1995

Related U.S. Application Data

[63] Continuation-in-part of Ser. No. 385,604, Feb. 9, 1995, Pat. No. 5,560,181, Ser. No. 370,334, Jan. 9, 1995, Pat. No. 5,537,800, and Ser. No. 253,513, Jun. 3, 1994, said Ser. No. 385,604, is a continuation of Ser. No. 313,675, Sep. 27, 1994, abandoned, which is a continuation of Ser. No. 188,183, Jan. 28, 1994, Pat. No. 5,388,386, which is a continuation of Ser. No. 968,798, Oct. 30, 1992, Pat. No. 5,369,934, which is a continuation of Ser. No. 865,563, Apr. 9, 1992, Pat. No. 5,245,814, which is a continuation of Ser. No. 649,379, Jan. 31, 1991, Pat. No. 5,111,638, which is a continuation of Ser. No. 249,761, Sep. 26, 1988, abandoned, said Ser. No. 370,334, is a continuation of Ser. No. 253,648, Jun. 3, 1994, abandoned, which is a continuation of Ser. No. 965,585, Oct. 23, 1992, abandoned, which is a continuation of Ser. No. 893,586, Jun. 2, 1992, Pat. No. 5,181,364, which is a continuation of Ser. No. 707,417, May 28, 1991, abandoned, which is a continuation of Ser. No. 502,358, Mar. 29, 1990, abandoned, which is a continuation-in-part of Ser. No. 249,761, Sep. 26, 1988, abandoned, said Ser. No. 253,513, is a continuation of Ser. No. 108,093, Aug. 17, 1993, Pat. No. 5,472,752, which is a continuation of Ser. No. 24,573, Mar. 1, 1993, abandoned, which is a continuation of Ser. No. 464,694, Jan. 16, 1990, Pat. No. 5,208,027, which is a continuation of Ser. No. 219,083, Jul. 13, 1988, Pat. No. 4,897,031, which is a continuation of Ser. No. 4,275, Jan. 5, 1987, Pat. No. 4,773,182, which is a continuation of Ser. No. 613,080, May 22, 1984, abandoned.

[51] Int. Cl.⁶ .............................. B65D 85/52; A01G 9/02; B65B 11/56

[52] U.S. Cl. ................... 206/423; 47/72; 53/397; 53/465; 229/87.01

[58] Field of Search ........................ 206/423, 460; 47/72, 84, 41.12, 41.13; 229/87.01; 53/397, 465

[56] References Cited

U.S. PATENT DOCUMENTS

| | | |
|---|---|---|
| D. 254,659 | 4/1980 | Karotseris . |
| 557,526 | 3/1896 | Egge . |
| 732,889 | 7/1903 | Paver . |

(List continued on next page.)

FOREIGN PATENT DOCUMENTS

| | | |
|---|---|---|
| 560532 | 4/1975 | France . |
| 2610604 | 8/1988 | France . |
| 345464 | 2/1917 | Germany . |

OTHER PUBLICATIONS

"Speed Cover—The Simple Solution For Those Peak Volume Periods", Highland Supply Corporation, 1989, 4 pgs.
"Speed Sheets and Speed Rolls", Highland Supply Corporation, 1990, 2 pgs.
"A World of Cut Flower and Pot Plant Packaging," Klerk's Plastic Productsw Manufacturing Inc. Brochure, date unknown, 6 pages.
Chantler & Chantler brochure showing Zipper Sleeve and Florasheet®, date unknown, 2 pages.
"Color Them Happy with Highlander Products" ©1992.
"Super Seller", Supermarket Floral, Sep. 15, 1992.
"Costa Keeps the Christmas Spirit", Supermarket Floral, Sep. 15, 1992.
"Now More Than Ever", Supermarket Floral, Sep. 15, 1992.
"Halloween", Link Magazine, Sep. 1992, 2 pages.

*Primary Examiner*—Bryon P. Gehman
*Attorney, Agent, or Firm*—Dunlap & Codding, P.C.

[57] ABSTRACT

A wrapping material comprising a sheet of material having a bonding material comprising a cold seal adhesive used to wrap floral groupings and/or flower pots. Methods for using a wrapping material having a cold seal adhesive thereon.

13 Claims, 7 Drawing Sheets

U.S. PATENT DOCUMENTS

| | | |
|---|---|---|
| 920,313 | 5/1909 | Franklin . |
| 1,069,675 | 8/1913 | Claussen . |
| 1,102,499 | 7/1914 | Haist . |
| 1,446,563 | 2/1923 | Hughes . |
| 1,525,015 | 2/1925 | Weeks . |
| 1,807,407 | 5/1931 | Hohnhorst . |
| 1,868,853 | 7/1932 | Sievers . |
| 1,978,631 | 10/1934 | Herrlinger . |
| 2,048,123 | 7/1936 | Howard . |
| 2,110,612 | 3/1938 | Skinner et al. . |
| 2,170,147 | 8/1939 | Lane . |
| 2,204,664 | 6/1940 | Clark . |
| 2,239,398 | 5/1941 | Palmer . |
| 2,260,230 | 10/1941 | Olson . |
| 2,278,673 | 4/1942 | Savada et al. . |
| 2,302,259 | 11/1942 | Rothfuss . |
| 2,355,559 | 8/1944 | Renner . |
| 2,367,749 | 1/1945 | Barbieri . |
| 2,371,985 | 3/1945 | Freiberg . |
| 2,411,328 | 11/1946 | MacNab . |
| 2,458,246 | 1/1949 | Brereton . |
| 2,482,981 | 9/1949 | Kamrass . |
| 2,510,120 | 6/1950 | Leander . |
| 2,529,060 | 11/1950 | Trillich . |
| 2,544,075 | 3/1951 | Ernst et al. . |
| 2,573,770 | 11/1951 | Meadow . |
| 2,621,142 | 12/1952 | Wetherell . |
| 2,622,380 | 12/1952 | Snyder . |
| 2,780,401 | 2/1957 | Stevens . |
| 2,822,287 | 2/1958 | Avery . |
| 2,845,735 | 8/1958 | Werner . |
| 2,846,060 | 8/1958 | Yount . |
| 2,850,842 | 9/1958 | Eubank, Jr. . |
| 2,883,262 | 4/1959 | Borin . |
| 2,967,652 | 1/1961 | Canfield et al. . |
| 3,013,689 | 12/1961 | Shropshire . |
| 3,022,605 | 2/1962 | Reynolds . |
| 3,113,712 | 12/1963 | Kindseth . |
| 3,121,647 | 2/1964 | Harris et al. . |
| 3,130,113 | 4/1964 | Silman . |
| 3,148,799 | 9/1964 | Meroney . |
| 3,189,502 | 6/1965 | Little . |
| 3,215,330 | 11/1965 | Thomas . |
| 3,271,922 | 9/1966 | Wallerstein et al. . |
| 3,318,748 | 5/1967 | Hurst . |
| 3,436,007 | 4/1969 | Rausing . |
| 3,466,214 | 9/1969 | Polk et al. . |
| 3,488,022 | 1/1970 | Vittori . |
| 3,508,372 | 4/1970 | Wallerstein et al. . |
| 3,514,012 | 5/1970 | Martin . |
| 3,542,616 | 11/1970 | Cain et al. . |
| 3,620,366 | 11/1971 | Parkinson . |
| 3,681,105 | 8/1972 | Milutin et al. . |
| 3,757,990 | 9/1973 | Buth . |
| 3,775,932 | 12/1973 | Jenney . |
| 3,791,902 | 2/1974 | Hanke et al. . |
| 3,793,799 | 2/1974 | Howe et al. . |
| 3,927,821 | 12/1975 | Dunning . |
| 3,962,503 | 6/1976 | Crawford . |
| 4,043,077 | 8/1977 | Stonehocker . |
| 4,054,697 | 10/1977 | Reed et al. . |
| 4,118,890 | 10/1978 | Shore . |
| 4,170,618 | 10/1979 | Adams . |
| 4,189,868 | 2/1980 | Tymchuck et al. . |
| 4,216,620 | 8/1980 | Weder et al. . |
| 4,280,314 | 7/1981 | Stuck . |
| 4,297,811 | 11/1981 | Weder . |
| 4,300,312 | 11/1981 | Weder . |
| 4,333,267 | 6/1982 | Witte . |
| 4,379,101 | 4/1983 | Smith . |
| 4,380,564 | 4/1983 | Cancio et al. . |
| 4,400,910 | 8/1983 | Koudstaal et al. . |
| 4,413,725 | 11/1983 | Bruno et al. . |
| 4,508,223 | 4/1985 | Catrambone . |
| 4,546,875 | 10/1985 | Zweber . |
| 4,621,733 | 11/1986 | Harris . |
| 4,640,079 | 2/1987 | Stuck . |
| 4,733,521 | 3/1988 | Weder et al. . |
| 4,765,464 | 8/1988 | Ristvedt . |
| 4,799,520 | 1/1989 | Blackburn et al. . |
| 4,801,014 | 1/1989 | Meadows . |
| 4,897,031 | 1/1990 | Weder et al. . |
| 4,941,572 | 7/1990 | Harris . |
| 4,996,822 | 3/1991 | Truppe . |
| 5,111,638 | 5/1992 | Weder . |
| 5,181,364 | 1/1993 | Weder . |
| 5,208,027 | 5/1993 | Weder et al. . |
| 5,228,234 | 7/1993 | de Klerk et al. . |
| 5,235,782 | 8/1993 | Landau . |
| 5,239,775 | 8/1993 | Landau . |
| 5,318,821 | 6/1994 | Bradley, Jr. . |
| 5,408,803 | 4/1995 | Weder et al. ............................ 53/399 |
| 5,410,856 | 5/1995 | Weder et al. ........................ 206/423 X |
| 5,488,813 | 2/1996 | Weder ...................................... 53/397 |
| 5,493,809 | 2/1996 | Weder et al. ................................ 47/72 |
| 5,497,881 | 3/1996 | Weder ..................................... 206/423 |

WRAPPING MATERIAL HAVING A COLD SEAL ADHESIVE FOR WRAPPING FLORAL GROUPINGS AND METHODS

CROSS REFERENCE TO RELATED APPLICATIONS

This application is a continuation-in-part of U.S. Ser. No. 08/385,604, filed Feb. 9, 1995, entitled METHOD AND APPARATUS FOR COVERING PORTIONS OF AN OBJECT WITH A SHEET OF MATERIAL HAVING A PRESSURE SENSITIVE ADHESIVE COATING APPLIED TO AT LEAST ONE SURFACE OF THE SHEET OF MATERIAL OR COHESIVE MATERIAL APPLIED THERETO, now U.S. Pat. No. 5,560,181; which is a continuation of U.S. Ser. No. 08/313,675, filed Sep. 27, 1994, entitled METHOD FOR WRAPPING AN OBJECT WITH AN EMBOSSED MATERIAL, now abandoned; which is a continuation of U.S. Ser. No. 08/188,183 filed Jan. 28, 1994, entitled METHOD AND APPARATUS FOR COVERING PORTIONS OF AN OBJECT WITH A SHEET OF MATERIAL HAVING A PRESSURE SENSITIVE ADHESIVE COATING APPLIED TO AT LEAST ONE SURFACE OF THE SHEET OF MATERIAL, now U.S. Pat. No. 5,388,386; which is a continuation of U.S. Ser. No. 07/968,798, filed Oct. 30, 1992, entitled METHOD AND APPARATUS FOR COVERING PORTIONS OF AN OBJECT WITH A SHEET OF MATERIAL HAVING A PRESSURE SENSITIVE ADHESIVE COATING APPLIED TO AT LEAST A PORTION OF AT LEAST ONE SURFACE OF THE SHEET OF MATERIAL, now U.S. Pat. No. 5,369,934; which is a continuation of U.S. Ser. No. 07/865,563, filed Apr. 9, 1992, entitled METHODS FOR WRAPPING A FLORAL GROUPING, now U.S. Pat. No. 5,245,814; which is a continuation of U.S. Ser. No. 07/649,379, filed Jan. 31, 1991, entitled METHOD FOR WRAPPING AN OBJECT WITH A MATERIAL HAVING PRESSURE SENSITIVE ADHESIVE THEREON, now U.S. Pat. No. 5,111,638; which is a continuation of U.S. Ser. No. 249,761, filed Sep. 26, 1988, entitled METHOD FOR WRAPPING AN OBJECT WITH A MATERIAL HAVING PRESSURE SENSITIVE ADHESIVE THEREON, now abandoned.

This application is also a continuation-in-part of U.S. Ser. No. 08/370,334, filed Jan. 9, 1995, entitled WRAPPING A FLORAL GROUPING WITH SHEETS HAVING ADHESIVE OR COHESIVE MATERIAL APPLIED THERETO, now U.S. Pat. No. 5,537,800; which is a continuation of Ser. No. 08/253,648, filed Jun. 3, 1994, entitled WRAPPING A FLORAL GROUPING WITH SHEETS HAVING ADHESIVE OR COHESIVE MATERIAL APPLIED THERETO, now abandoned; which is a continuation of U.S. Ser. No. 07/965,585, filed on Oct. 23, 1992, entitled WRAPPING A FLORAL GROUPING WITH SHEETS HAVING ADHESIVE OR COHESIVE MATERIAL APPLIED THERETO, now abandoned; which is a continuation of U.S. Ser. No. 07/893,586, filed Jun. 2, 1992, entitled WRAPPING A FLORAL GROUPING WITH SHEETS HAVING ADHESIVE OR COHESIVE MATERIAL APPLIED THERETO, now U.S. Pat. No. 5,181,364; which is a continuation of U.S. Ser. No. 07/707,417, filed May 28, 1991, entitled WRAPPING A FLORAL GROUPING WITH SHEETS HAVING ADHESIVE OR COHESIVE MATERIAL APPLIED THERETO, now abandoned; which is a continuation of U.S. Ser. No. 07/502,358, filed Mar. 29, 1990, entitled WRAPPING A FLORAL GROUPING WITH SHEETS HAVING ADHESIVE OR COHESIVE MATERIAL APPLIED THERETO, now abandoned; which is a continuation-in-part of U.S. Ser. No. 249,761, filed Sep. 26, 1988, entitled METHOD FOR WRAPPING AN OBJECT WITH A MATERIAL HAVING PRESSURE SENSITIVE ADHESIVE THEREON, now abandoned.

This application is also a continuation-in-part of U.S. Ser. No. 08/253,513, filed Jun. 3, 1994, entitled ARTICLE FORMING SYSTEM, now abandoned; which is a continuation of U.S. Ser. No. 08/108,093 filed Aug. 17, 1993, entitled ARTICLE FORMING SYSTEM, now U.S. Pat. No. 5,472,752; which is a continuation of U.S. Ser. No. 08/024,573, filed Mar. 1, 1993, entitled ARTICLE FORMING SYSTEM, now abandoned; which is a continuation of Ser. No. 07/464,694, filed Jan. 16, 1990, entitled ARTICLE FORMING SYSTEM, now U.S. Pat. No. 5,208,027; which is a continuation of U.S. Ser. No. 219,083, filed Jul. 13, 1988, entitled ARTICLE FORMING SYSTEM, now U.S. Pat. No. 4,897,031; which is a continuation of U.S. Ser. No. 004,275, filed Jan. 5, 1987, entitled ARTICLE FORMING SYSTEM, now U.S. Pat. No. 4,773,182; which is a continuation of U.S. Ser. No. 613,080, filed May 22, 1984, entitled ARTICLE FORMING SYSTEM, now abandoned.

FIELD OF THE INVENTION

This invention relates to wrapping materials and particularly, wrapping materials having a cold seal adhesive disposed thereon used to wrap floral groupings and flower pots, and methods of using same.

3

DESCRIPTION OF THE PREFERRED EMBODIMENTS

Figure 1:
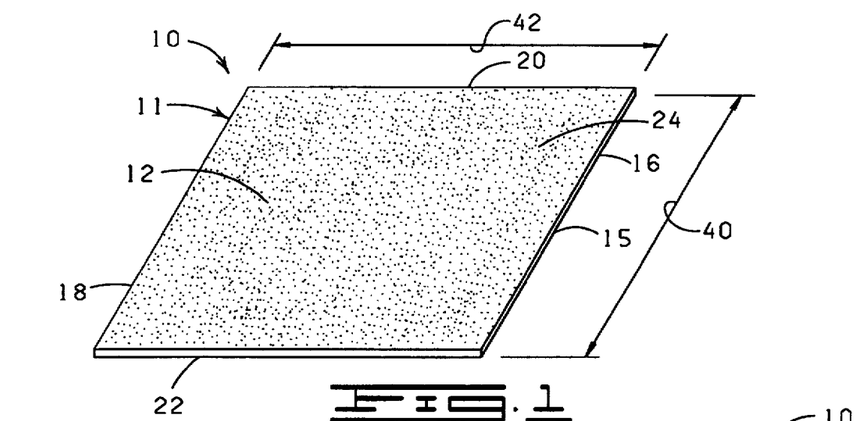
FIG. 1 is a perspective view of the wrapping material of the present invention showing the upper surface, the wrapping material having a bonding material thereon.
Figure 2:
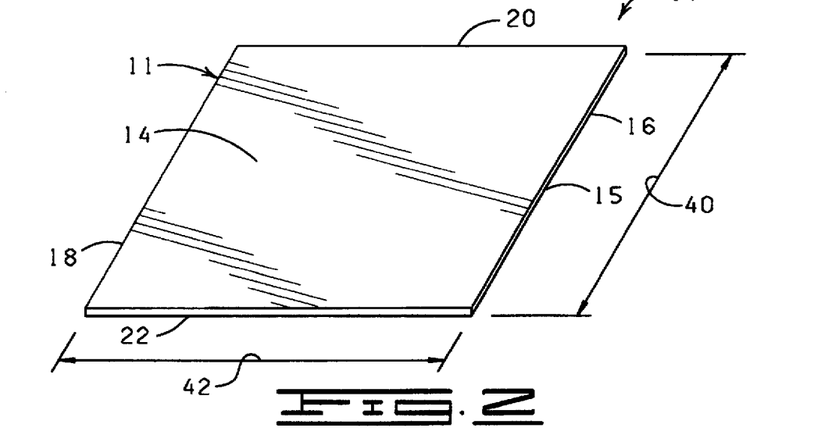
FIG. 2 is a perspective view of the wrapping material of FIG. 1, but showing the lower surface thereof.

The Embodiments of FIGS. 1-2

Wrapping material is used to wrap about floral groupings and flower pots. Some wrapping materials pull away, or are unwrapped from an item, such as a floral grouping or flower pot, easily. Such wrapping materials have a releasable adhesive or cohesive which permits easy release of any bonded portions. Sometimes, it is desirable to have an adhesive or cohesive which does not permit easy release. Such an adhesive or cohesive is substantially non-releasable, and a wrapping material must be torn away (cutting, tearing, and all other forms of removal which integrally effects the structural integrity of the wrapping material is termed herein "tearing") from an item to effectively release the wrapping material. In some applications, this firm, non-releasable bonding is desirable.

4

Further, most adhesives adhere to both similar and non-similar substrates. Cohesive only cohere to a similar substrate, such as the same cohesive. Yet, many adhesives and cohesive are readily releasable. In certain applications, it is desirable to have an adhesive, or cohesive, which acts only as a cohesive, i.e., the adhesive and/or cohesive connects only to a similar substrate.

The present invention discloses a wrapping material comprising a cold seal adhesive which acts as a cohesive, adhering only to itself (same substrate), and which forms a firm, non-releasable bond to itself. This wrapping material, when bonded to itself, requires the wrapping material to be torn away to release such a bond. This type of bond is desirable especially in preforming decorative covers, such as flower pot covers, because the cold seal adhesive adheres only to itself, therefore it does not cause a sticky residue to build up on the mold and equipment used to form the decorative covers. Further, the cover is assisted in retaining its formed shape, since an article formed by using this wrapping material having a cold seal adhesive is substantially non-releasable. Such a decorative cover will retain its formed shape until literally torn apart.

Shown in FIGS. 1 and 2 and designated therein by the general reference numeral 10 is a wrapping material. The wrapping material comprises a sheet of material 11. The sheet of material 11 has an upper surface 12 (FIG. 1), a lower surface 14 (FIG. 2), and an outer periphery 15. As illustrated in FIGS. 1 and 2, the outer periphery 15 further comprises a first side 16, a second side 18, a third side 20 and a fourth side 22.

A bonding material 24 may be disposed from the upper surface 12 of the sheet of material 11. As shown in FIG. 1, the bonding material 24, is disposed substantially over the upper surface 12 of the sheet of material 11. The bonding material 24 may also be disposed upon the upper surface 12 in one or more strips of bonding material 24, although the bonding material 24 could also be applied to the upper surface 12 of the sheet of material 11 in the form of spaced apart spots, or the bonding material 24 could also be disposed of the upper surface 12 of the sheet of material 11 in any other geometric or non-geometric or asymmetric forms, and/or in any patterns or designs, including fanciful patterns or designs. It will be further appreciated that the bonding material 24 may be disposed on the lower surface 14 of the sheet of material 11 in the same manner as just described for the upper surface 12. In addition, the bonding material 24 may be disposed upon both the upper surface 12 and the lower surface 14 of the sheet of material 11.

The sheet of material 11 has a thickness in a range from about 0.1 mils to 30 mils. In one embodiment, the sheet of material has a thickness in a range from about 0.2 to about 3.5 mils. In another embodiment, the sheet of material has a thickness in a range from about 2.0 mils to about 5.0 mils. In still yet another embodiment, the sheet of material has a thickness in a range from about 4.0 mils to about 10.0 mils. The sheet of material 11 may be constructed from a material which is flexible. The sheet of material 11 may also be constructed from a material which is semi-rigid. Further, the sheet of material may be constructed from a material which combines flexible and semi-rigid characteristics. The sheet of material 11 may be any shape and the square shape shown in FIGS. 1 and 2 is only by way of example. The sheet of material 11, for example, but not by way of limitation, may be square, rectangular, circular, or any other geometric, non-geometric, asymmetric or fanciful shape such as, for example, heart shaped.

The sheet of material 11 may be constructed of a single layer of material or a plurality of layers of the same or different types of materials. The layers of material comprising the sheet of material 11 may be laminated together or connected together by any method known in the art. In one embodiment, the first sheet of material 11 is constructed from at least two polypropylene films (a 20"×15" sheet of Mobil 270ABW white opaque film laminated to a 20"×15" sheet of Mobil 220AB clear film) having a thickness in a range from less than about 0.5 mils to about 3 mils. The layers of material comprising the sheet of material 11 may be connected together or laminated together, or may comprise separate layers.

The sheet of material 11 is constructed from any suitable wrapping material that is capable of being wrapped about a flower pot or a floral grouping. Preferably, the sheet of material 11 comprises paper (the term "paper" is used herein means treated or untreated paper, corrugated paper or cardboard or any other form of paper material), cellophane, foil, polymer film, non-polymer film, metalized film, fabric (woven and non-woven, synthetic or natural) fiber (synthetic or natural) burlap, denim, leather, or combination thereof).

The term "polymer film" is used herein means a thermal plastic resinous material, such as, but not by way of limitation, the man-made polymer such as, for example only, polypropylene. The term "polymer film" as used herein also means a naturally occurring polymer such as cellophane. A polymer film, as contemplated and described in detail herein, is relatively strong and not subject to tearing (substantially non-tearable), as might be the case with paper or foil.

The sheet of material 11 has a length 40 extending between the respective third and fourth sides 20 and 22 of the sheet of material 11. The sheet of material 11 also has a width 42 extending between the first and seconds sides 16 and 18, respectively, of the sheet of material 11.

As noted earlier, a bonding material 24 may be disposed upon the sheet of material 11. One method for disposing a bonding material 24 on a sheet of material is described in U.S. Pat. No. 5,111,637 entitled "Method For Wrapping A Floral Grouping" issued to Weder et al., on May 12, 1992 and which is hereby incorporated herein by reference.

The term "bonding material" when used herein means a cold seal adhesive. The term "cold seal adhesive" as used herein means a substance which is non-tacky to non-similar substrates. In that sense, the cold seal adhesive acts as a cohesive. It will be understood, therefore, that the cold seal adhesive requires a similar cold seal adhesive material to be placed on the adjacent surface for bondingly contacting and bondingly engaging with the cold seal adhesive on the opposing surface or area. The cold seal adhesive used herein is non-tacky to equipment and all other surfaces having a non-similar substrate. Therefore, the cold seal adhesive requires no protection of equipment to prevent buildup of unwanted adhesive or cohesive material. Further, items formed by cold seal adhesive, such as, but not by way of limitation, flower pot covers, are formed more rapidly using a cold seal adhesive because no heat from a mold is required, therefore the dwell time, that is, the time required for the sheet of material to be firmly formed into a specified article by a mold, such as a flower pot cover, is reduced. Such a reduction in dwell time permits more articles, such as pot covers, to be formed in the same amount of time, thereby saving labor costs. A cold seal adhesive requires a minimal pressure to contactingly and bondingly engage to the similar substrate. And, once the cold seal adhesive is engaged to the similar substrate, the cold seal adhesive is not readily releasable. In this area, and in others described above, the cold seal adhesive differs from other adhesives, such as, for example, a pressure sensitive adhesive. One cold seal adhesive, namely, No. 35 6174 GCE 087, may be obtained from National Starch & Chemical Company, Finderne Ave., Bridgewater, N.J. 08807.

The sheet of material 11 may consist of designs or decorative patterns which are printed, etched, and/or embossed thereon using inks or other printing materials. An example of an ink which may be applied to the surface of the sheet of material 11 is described in U.S. Pat. No. 5,147,706 entitled "Water Based Ink On Foil And/Or Synthetic Organic Polymer" issued to Kingman on Sep. 15, 1992 and which is hereby incorporated herein by reference. In addition, the sheet of material 11 may have various colorings, codings, embossings, flockings, and/or metallic finishes, or other decorative surface ornamentation applied separately or simultaneously or may be characterized totally or partially by pearlescent, translucent, transparent, iridescent, neon, or the like, qualities. Each of the above named characteristics may occur alone or in combination and may be applied to the upper and/or lower surfaces of the sheet of material 11. Moreover, each surface of the sheet of material 11 may vary in the combination of such characteristics. The sheet of material 11 may be completely or partially opaque, translucent, clear or tinted transparent.

The bonding material 24 may also be tinted or colored by using a die, pigment, or ink. In this manner, different coloring effects are produced, and the sheet of material 11 may be given a colored appearance for a colored decoration by use of the bonding material 24. U.S. Pat. No. 5,147,706 described immediately above and incorporated by reference provides one water based ink which may be used to tint either the sheet of material 11 or the bonding material 24. The bonding material 24 may comprise a part or all of a decoration or design which is printed, etched embossed, or otherwise disposed upon the sheet of material 11. In particular, the bonding material 24 may comprise one or more designs and/or decorations, and may also comprise one or more colors.

Figure 3:
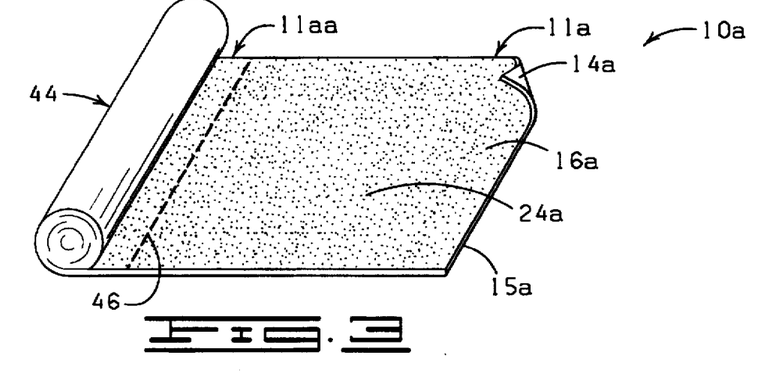
FIG. 3 is a perspective view of the wrapping material of FIGS. 1–2, but showing a continuous roll of material comprising a plurality of sheets of material contained within a roll.
Figure 4:
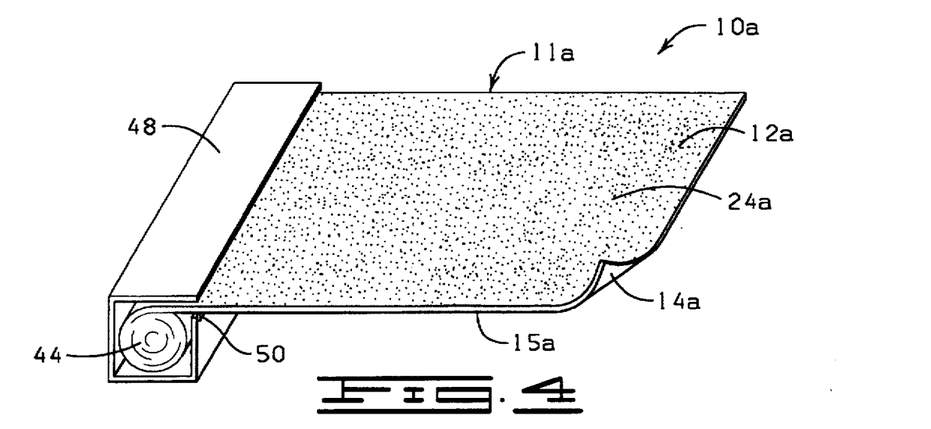
FIG. 4 is a perspective view of the wrapping material of FIGS. 1–2, but showing a continuous roll of material comprising a plurality of sheets of material contained within a roll in a dispenser.

The sheet of material 11 having the bonding material 24 disposed thereon forms a single sheet of material 11 as shown in FIGS. 1 and 2, rolls of wrapping material, as shown in FIGS. 3 and 4, and/or pads of wrapping material, the latter two being described in further detail below.

Embodiments of FIGS 3–4

Referring now to FIGS. 3 and 4, a plurality of individual sheets of material 11a which are constructed exactly like the sheet of material 11 shown in FIGS. 1 and 2 and described in detail previously are connected linearly together to form a roll 44. Preferably, the plurality of sheets of material 11a in the roll 44 are connected by perforations 46 as illustrated in FIG. 3. Thus a roll 44 permits one sheet of material 11a to be withdrawn from the roll 44 then severed or disconnected from the roll 44. Alternatively, the roll 44 may simply be formed as a continuous roll 44 of wrapping material 10a without perforations, wherein a plurality of sheets of material 11a may be removed from the roll 44 by unrolling a portion of the roll 44, and using a separate cutting element (not shown) to sever the unrolled portion of the roll 44 of material to form the sheet of material 11a. The roll 44 may also be contained within a dispenser 48, as illustrated in FIG. 4. When the roll 44 is disposed in the dispenser 48 a portion of the wrapping material 10a is again unrolled, and a serrated cutting edge 50 contained within the dispenser 48 or a separated cutting element (not shown) severs the unrolled portion of the wrapping material 10a from the roll 44 to form a sheet of material 11a. Any number of sheets of material 11a may form a roll 44 as long as it is possible to withdraw at least one sheet of material 11a from the roll 44 as described herein. A roll 44 may also be formed by only one sheet of wrapping material 10a (not shown).

Figures 5, 6:
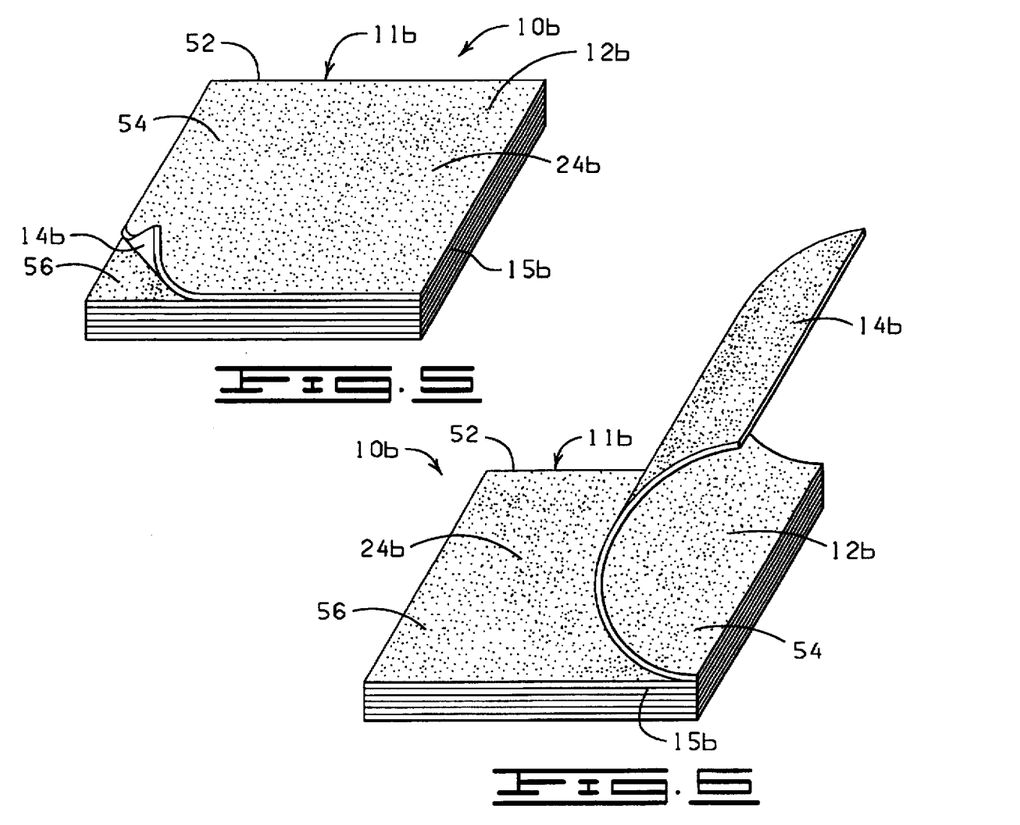
FIG. 5 is a perspective view of the wrapping material of FIGS. 1–2, but showing a plurality of sheets comprising a pad.
FIG. 6 is a perspective view of the wrapping material of FIG. 3, but showing a top sheet being withdrawn from the pad.
Figure 7:
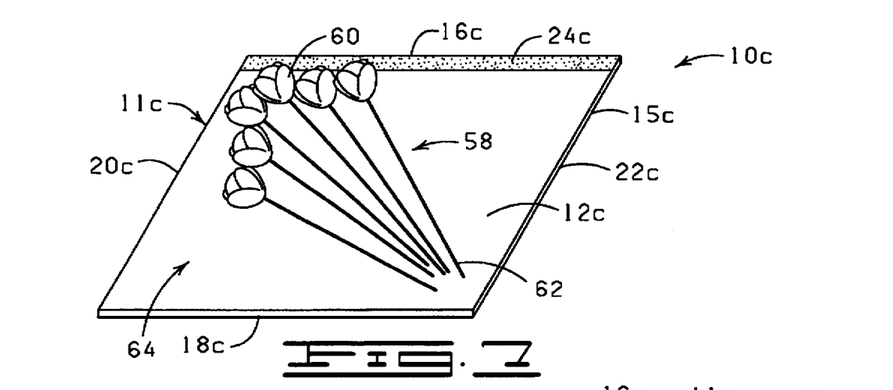
FIG. 7 is a perspective view of the wrapping material of FIGS. 1–2, but a single strip of bonding material extending near the first side of the sheet of material, and showing a floral arrangement disposed thereon.

Embodiments of FIGS. 5–6

Shown in FIGS. 5 and 6 is a modified wrapping material 10b which is identical to the wrapping material 10 shown in FIGS. 1 and 2 and described in detail previously, except that the wrapping material 10b is formed into a plurality of sheets of material 11b which are stacked and aligned one on top of the other to form a pad 52 of sheets of material 11b.

The pad 52 comprises a top sheet 54 having a next sheet 56 disposed directly thereunder, with additional sheets of wrapping material 11b disposed under the next sheet of material 56, all sheets of material 11b collectively forming the pad 52 of sheets of material 11b (one edge of the top sheet 54 lifted for illustration purposes only in FIG. 5). The sheets of material 11b are generally aligned and are connected together by a bonding material 24b.

When the top sheet 54 of wrapping material 10b is lifted and removed from the pad 52, as shown in FIG. 6, the next sheet of material 56 becomes the new top sheet 54 and the sheet of material 11b directly below the new top sheet 54 becomes the new next sheet 56. This process is repeated, until all of the sheets of material 11b in the pad 52 are removed.

In operation, a floral grouping or flower pot may be placed on the top sheet 54 in the pad 52 and the top sheet 54 may be wrapped about the floral grouping or the flower pot, said wrapping of either item resulting in removal of the top sheet 54 from the pad 52. Methods of forming a pad 52, and using the sheets of material 11b from the pad 52 to wrap floral groupings, and removing sheets from the pad 52, are described in U.S. Pat. No. 5,181,364 entitled "Wrapping A Floral Grouping With Sheets Having Adhesive Or Cohesive Material Applied Thereto" issued to Weder on Jan. 26, 1993, which is hereby incorporated by reference herein.

Embodiments and Methods of FIGS. 7–10

As noted previously, a sheet of material may be used to wrap a floral grouping 58, as illustrated in FIGS. 7–10. "Floral grouping" as used herein means cut fresh flowers, artificial flowers, a single flower and fresh or other fresh and fresh or artificial plants or other floral materials and may include other secondary plants and/or ornamentation or artificial or natural materials which add to the aesthetics of the overall floral grouping. The floral grouping 58 comprises a bloom (or foliage) portion 60 and a stem portion 62, however, it will be appreciated that the floral grouping 58 may consist of only a single bloom or only foliage (not shown). The term "floral grouping" may be used interchangeably herein with the term "floral arrangement."

In a method of use, a modified sheet of material 11c is provided, which is identical to the sheet of material 11 shown in FIGS. 1 and 2 and described in detail previously, except that the sheet of material 11c has a strip of bonding of material 24c disposed on the upper surface 12c and near the first side 16c of the sheet of material 11c, the strip of bonding material 24c extending between the respective third and fourth sides 20c and 22c of the sheet of material 11c.

Figure 8:
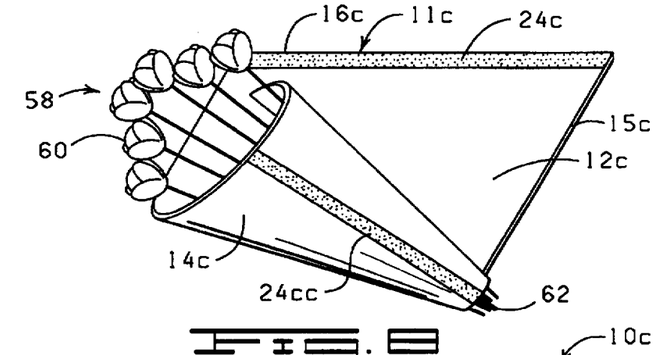
FIG. 8 is a perspective view of the wrapping material of FIG. 7, but showing a partially wrapped floral arrangement, a strip of bonding material disposed on the lower surface of the sheet of material.

A floral grouping 58 having a bloom portion 60 and a stem portion 62 (FIG. 7) is disposed on the upper surface 14c of the sheet of material 11c. The sheet of material 11c then is wrapped about the floral grouping 58 by taking the second side 18c and rolling the sheet of material 11c in a direction 64 about the floral grouping 58 (FIG. 8). The sheet of material 11c is continued to be rolled about the floral grouping 58 until a portion of the bonding material 24c is disposed adjacent a portion of the lower surface 14c of the sheet of material 11c having a bonding material 24cc thereon and brought into bonding contact and/or bonding engagement therewith (FIG. 9), thereby bondingly contacting and bondingly connecting the bonding material 24c on the upper surface 12c of the sheet of material 11c to a portion of the bonding material 24cc on the lower surface 14c of the sheet of material 11c for cooperating to secure the sheet of material 11c in a wrapped condition about the floral grouping 58 to form and provide a wrapper 66 wrapped about the floral grouping 58, as shown in FIG. 9.

Figure 9:
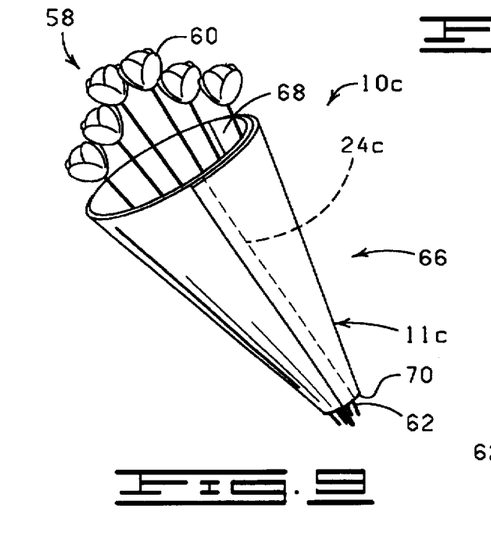
FIG. 9 is a perspective view of the wrapping material of FIGS. 7–8, but showing a wrapped floral arrangement, the wrapping forming a frusto-conical shape.

As shown in FIG. 9, the wrapper 66 forms a conical shape, the wrapper 66 having an open upper end 68 and a open lower end 70, with an opening extending through both the open upper end 68 and the open lower end 70. In one alternative, the open lower end 70 is closed about the stem portion 62 (not shown). The wrapper 66 frequently covers at least a portion of the bloom portion 60 of the floral grouping 58 (not shown), and often covers a substantial portion of the bloom portion 60 of the floral grouping 58 (not shown). In this latter instance, the wrapper 66 may encompass and enclose the bloom portion 60 of the floral grouping 58, and the open upper end 68 may be closed by a flap thereover (not shown) or be any means known in the art to enclose the bloom portion 60 of the floral grouping 58. A portion of the stem portion 62 of the floral grouping 58 may extend through the lower end 70 of the wrapper 66. The wrapper 66 may be tightly wrapped about the stem portion 62 of the floral grouping 58, or may be more loosely wrapped thereabout. Bonding material 24c on the sheet of material 11c may contact and engage some of the stem portion 62 of the floral grouping 58 to cooperate in securing the wrapper 66 wrapped about the stem portion 62 and to prevent the floral grouping 58 from slipping or moving within the wrapper 66. Alternatively, the bonding material 24c on the sheet of material 11c will contact and engage only other portions of the bonding material 24c on the sheet of material 11c in cooperating to secure the wrapper 66 tightly wrapped about the stem portion 62.

At least a portion of the floral grouping 58 is disposed within the wrapper 66. In some applications, the stem portion 62 of the floral grouping 58 does not extend through the open lower end 70 of the wrapper 66. In certain applications, the wrapper 66 is tightly wrapped about the stem portion 62 of the floral grouping 58. The bloom portion 60 of the floral grouping 58 is often disposed near the open upper end 68 of the floral grouping 58 and is visible. In some instances, the bloom portion 60 of the floral grouping 58 may extend beyond the open upper end 68 of the wrapper 66.

Figure 10:
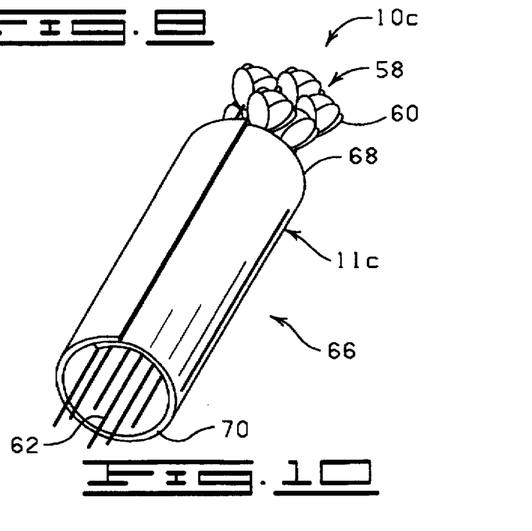
FIG. 10 is a perspective view of the wrapping material of FIGS. 7–8, but showing a wrapped floral arrangement, the wrapping forming a cylindrical shape.

The wrapper 66 as shown in FIG. 9, is generally conically shaped. The sheet of material 11c may also be wrapped about the floral grouping 58 to form a generally cylindrically shaped wrapper 66 as well, as shown in FIG. 10. It will be appreciated that other shapes of wrappers are possible and may be desired in a particular application, such as a geometric, non-geometric, asymmetric, and/or fanciful, or any combination of the foregoing.

U.S. Pat. No. 5,181,364, entitled "Wrapping A Floral Grouping With Sheets Having An Adhesive Or Cohesive Material Applied Thereto," issued to Weder et al. on Jan. 26, 1993, which has been incorporated by reference herein previously discloses methods of wrapping a floral grouping in a cylindrically shaped wrapper.

The Embodiments and Methods of FIGS. 11-14

Figure 11:
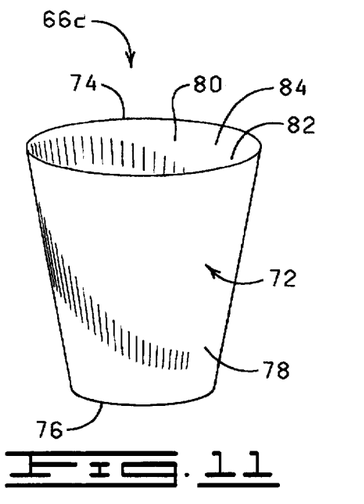
FIG. 11 is a perspective view of the wrapping material of FIGS. 1–2, but showing the wrapping material formed into a sleeve.

Shown in FIG. 11 and designated therein by the general reference numeral 66d is a wrapper for a floral grouping 58d constructed from the sheet of material 11d, as shown in FIGS. 1-2 and described in detail herein previously, except that the wrapper 66d comprises a sleeve 72 which may be generally tubular in shape, or alternatively, frusto-conical in shape, or, in a further alternative, any geometric, non-geometric, asymmetric and/or fanciful shape. The sleeve 72 has a first end 74, a second end 76, an outer peripheral surface 78 and an opening 80 intersecting both the first end 74 and the second end 76, forming an inner peripheral surface 82 and providing a retaining space 84 therein. In some embodiments (not shown), the second end 76 is closed, forming a closed end (not shown), and the opening 80 only intersects the first end 74 of the sleeve 72. The sleeve 72 may be formed of a single sheet of material 11d, or alternatively, two or more sheets of material 11d may be utilized. When two sheets of material 11d are used, the sheets of material 11d will be aligned one on top of the other with at least two opposing sides being joined together to form the sleeve 72. Sleeves, and their construction, are well known in the art and sleeves are commercially available, as are various devices and mechanisms capable of forming sleeves.

Figure 12:
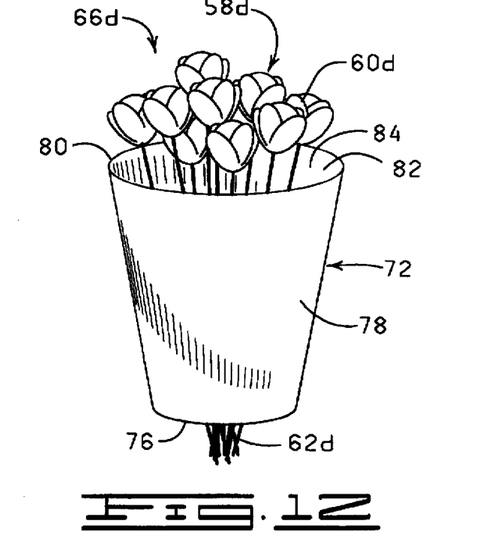
FIG. 12 is a perspective view of the sleeve of FIG. 11, but showing a floral arrangement disposed therein.

The wrapper 66d further comprises both the sleeve 72 and a floral grouping 58d (FIG. 12). The sleeve 72 is adapted to receive the floral grouping 58d within the retaining space 84.

Figure 14:
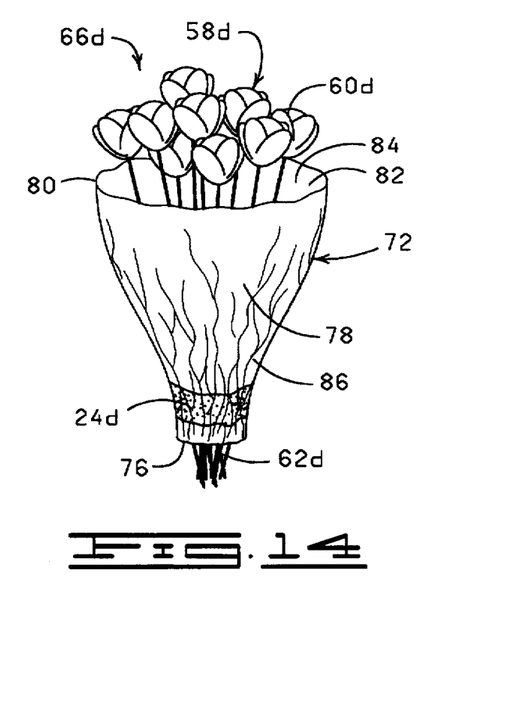
FIG. 14 is a perspective view of the sleeve of FIG. 13, but showing a bonding material disposed near the lower end of the sleeve.

A bonding material 24d as described previously herein may be disposed on at least a portion of the inner peripheral surface 82 of the sleeve 72 (not shown), or, alternatively, the bonding material 24d may be disposed on the outer peripheral surface 82 of the sleeve 72, as illustrated in FIG. 14, or, in a further alternative, the bonding material 24d may be disposed on both the inner peripheral surface 82 and the outer peripheral surface 78 of the sleeve 72 (not shown).

Figure 13:
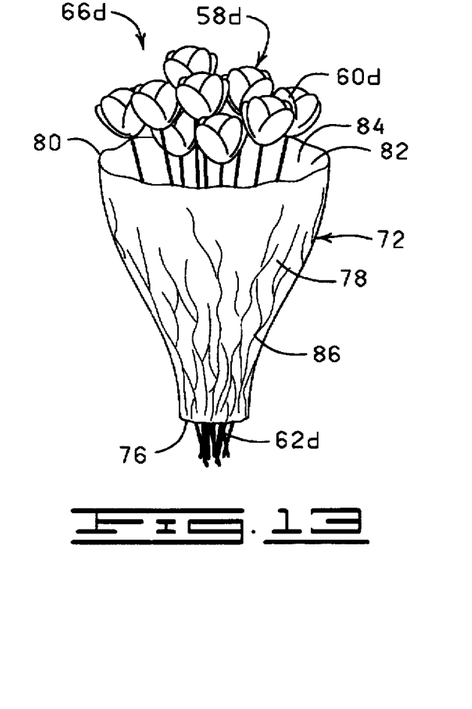
FIG. 13 is a perspective view of the sleeve of FIG. 12, but showing the sleeve crimped about the floral arrangement.

In a general method of use, illustrated in FIGS. 12-14, at least a portion of the floral grouping 58d is disposed within the sleeve 72. In some applications, the stem portion 62d of the floral grouping 58d extends into the sleeve 72 via the opening 80 in the first end 74, extending near or to the second end 76 of the sleeve 72 and, in some applications, beyond the open second end 76. The bloom portion 60d of the floral grouping 58d is therefore disposed near or below the first end 74 of the sleeve 72 and the bloom portion 60d of the floral grouping, 58d is visible via the open first end 74 of the sleeve 72. (FIGS. 12-14). In some instances, the bloom portion 60d of the floral grouping 58d may extend above the first end 74 of the sleeve 72. In some applications, the first end 74 of the sleeve 72 may be closed if desired (not shown). In some circumstances, the second end 76 of the sleeve 72 may be closed if desired (not shown).

In one method of use (FIGS. 12-14), an operator provides a sleeve 72 (FIG. 11), and a floral grouping 58d (FIG. 12). The operator then disposes the floral grouping 58d into the sleeve 72 by opening the sleeve 72 at the first end 74 and assuring both that the opening 80 therein is in an open condition, and that the inner peripheral surface 82 of the sleeve 72 is somewhat expanded outward as well, the retaining space 84 sized to receive the floral grouping 58d, as shown in FIGS. 11. The operator then disposes the floral grouping 58d into the opening 80 in the sleeve 72 and into the retaining space 84 by inserting first the stem portion 62d of the floral grouping 58d into the retaining space 62d of the sleeve 72 via the opening 80 in the first end 74, in a manner which permits a portion of the stem portion 62d to be disposed in the retaining space 84 adjacent the second end 76 of the sleeve 72, the second end 76 generally having the narrowest diameter. By inserting the floral grouping 58d into the sleeve 72 in this manner, the bloom portion 60d is also disposed in the retaining space 84 of the sleeve 72 adjacent the first end 74 of the sleeve 72, the first end 74 having generally having the widest diameter. Often in this method, at least a portion of the stem portion 62d of the floral grouping 58d extends beyond the second end 76 of the sleeve 72, and the bloom portion 60d of the floral grouping 58d is clearly visible at the open first end 74 of the sleeve 72.

The sleeve 72 may then, optionally, be crimped about the floral grouping 58d, as shown in FIGS. 13–14. The crimping operation is conducted by an operator after the floral grouping 58d is disposed in the sleeve 72 by crimping at least a portion of the sleeve 72 in the area about the floral grouping 58d, frequently, for example, but not by way of limitation, near the stem portion 62d of the floral grouping 58d. At least a portion of the bonding material 24d is disposed on this area to retain the crimped sleeve 72 in the crimped condition. Such crimping may be conducted by hand, by grasping and substantially encompassing with one or more hands a portion of the sleeve 72 desired to be crimped 6 in the area of the bonding material 24d and evenly and firmly squeezing that portion of the sleeve 72 about the area having the bonding material 24d, thereby pressing and gathering both the sleeve 72 and the bonding material 24d against itself and about the portion of the floral grouping 58d. The sleeve 72 may also be crimped by using both a crimping motion (as described above) and a turning motion to create a twisted crimping, resulting in a sleeve 72 which is both crimped as previously described, and which is twisted about at least a portion of the floral grouping 58d, the sleeve 72 being rotated for example but not by way of limitation, about the stem portion 62d between about one-eighth of a turn to about a full turn (not shown).

When the sleeve is crimped, a plurality of overlapping folds 86 are formed in the crimped area. The plurality of overlapping folds 86 (only one overlapping fold designated by the numeral 86) resulting from the gathered, crimped material of the sleeve 72 may be connected, that is, all portions of the overlapping sheet of material 11d of the sleeve 72 are bondingly connected together via bonding material 24d. A plurality of overlapping folds 86 may be formed by hand, during crimping, or by mechanical means. Such mechanical means are disclosed generally in "Article Forming System," which has been previously incorporated by reference herein. Alternatively, the crimping may be conducted in a manner in which not all of the plurality of overlapping folds 86 are bondingly connected together. It will be appreciated that the plurality of overlapping folds 240 (connected or unconnected) are formed primarily in the crimped area. Such crimping as described above may also be conducted by any device or mechanism known in the art and used for gathering or crimping materials.

Alternatively, the sleeve 72 may remain uncrimped. The bonding material 24d disposed upon the sleeve 72 may cause the sleeve 72 to bondingly connect to portions of itself, causing the sleeve 72 to conform, either generally, or closely (depending, as will be appreciated, upon the amount of bonding material 24f and the amount of the sheet of material 11d of the sleeve 72 which overlaps and connects to itself) to the floral grouping 58d.

When the floral grouping 58d is disposed in the sleeve 72 by any method described herein, or known in the art, the sleeve 72 substantially surrounds and encompasses a substantial portion of the floral grouping 58d. When the sleeve 72 is disposed about the floral grouping 58d, the sleeve 72 forms the wrapper 66d which provides a decorative packaging for the floral grouping 58d contained therein. It will be appreciated that the sleeve 72 has sufficient flexibility but also sufficient rigidity to both remain in and sustain its general shape.

Figures 15, 16:
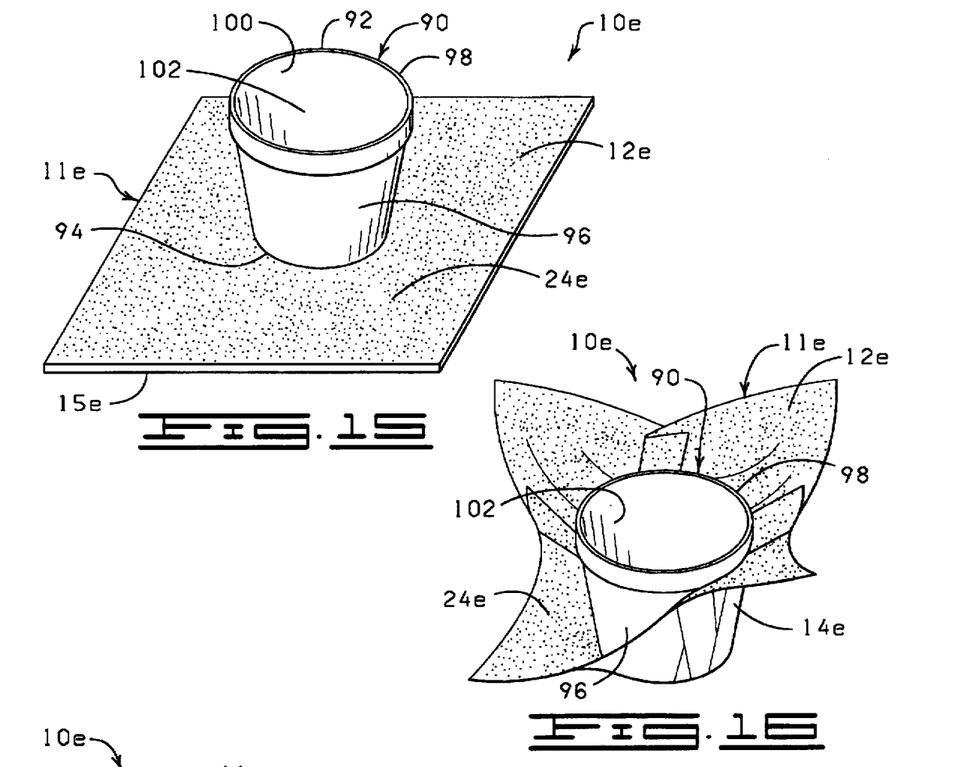
FIG. 15 is a perspective view of the wrapping material of FIGS. 1-2 having a pot disposed thereon.
FIG. 16 is a perspective view of the wrapping material and pot of FIG. 15, but showing the pot partially wrapped.
Figure 17:
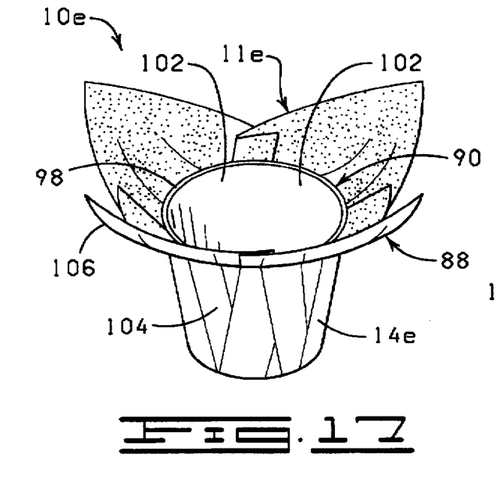
FIG. 17 is a perspective view of the wrapping material and pot of FIG. 15, but showing the pot wrapped.

Embodiments of FIGS. 15–17

As noted previously, a sheet of material 11 may be used to provide a decorative cover 88 for an object such as a flower pot 90 or a potted plant. The term "flower pot" refers to any type of container used for holding a floral grouping or a potted plant. Examples of flower pots used in accordance with the present invention include, but not by way of limitation, clay pots, plastics pots, wooden pots, pots made from natural and/or synthetic fiber, and any combination thereof.

The flower pot 90 has an open upper end 92, a closed lower end 94 (said closed lower end sometimes comprising one or more small openings for drainage of water), and an outer peripheral surface 96. An opening 98 intersects the open upper end 92 forming an inner peripheral surface 100 and a retaining space 102.

A modified sheet of material 11e, identical to the sheet of material 11 shown in FIGS. 1 and 2 and described in detail previously is provided. To cover the object, the sheet of material 11e may be manually or automatically formed about the outer peripheral surface 96 of the flower pot 90 or potted plant. Or, alternatively, the sheet of material 11e may be formed into a preformed decorative cover 88 which is then placed about the outer peripheral surface 96 of the pot 90 or potted plant.

In a method of use, referring to FIGS. 15–17, to form a sheet of material 11e into a decorative cover 88 about a flower pot 90, both a flower pot 90 and a sheet of material 11e are provided. The pot 90 is disposed upon the upper surface 12e of the sheet of material 11e, so that the lower end 94 of the pot 90 rests upon a portion of the upper surface 12e.

In one embodiment of a manual application of a sheet of material 11e about the pot 90, the upper surface 12e of the sheet of material 11e is formed about the outer peripheral surface 96 of the pot 90 (FIGS. 16–17), thereby engaging one portion of the bonding material 24e on the sheet of material 11e with an adjacent portion of bonding material 24e on the sheet of material 11e, thereby causing the sheet of material 11e to form a shape when molded manually about the outer peripheral surface 96 of the flower pot 90, thereby forming a decorative cover 88 which is used to decoratively cover a flower pot 90, in a manner which is known to those having ordinary skill in the art. The lower surface 14e of the sheet of material 11e thereby becomes the outer surface 104 of the decorative cover 88.

It will be appreciated that when the sheet of material 11e is formed into a decorative cover 88, the sheet of material 11e may also comprise a skirt 106 which extends outwardly from the decorative cover. The skirt may be round, square, or form any geometric, non-geometric, asymmetrical, and/or fanciful shape, that is, for example only, a heart shape.

A decorative cover 88 may also be formed by wrapping a sheet of material 11e about a flower pot 90, as described above, the sheet of material 11e then being at least partially secured to the outer peripheral surface 96 of the pot 90 by the use of the bonding materials described herein. In a further alternative, all or a portion of the sheet of material 11e may be secured to the pot 90 via the application of a band (not shown). One particular method of securing the decorative cover 88 to the pot 90 via the application of a band (not shown) disposed about the sheet of material 11d and about the pot 74 to both aid in forming and holding the decorative cover 72 in place about the pot 74 is described in U.S. Pat. No. 5,105,599 entitled "Means For Securing A Decorative Cover About A Flower Pot" issued to Weder on Apr. 21, 1992, and which is hereby incorporated herein by reference herein.

The term "band" when used herein means any material which may be secured about an object such as a flower pot, such bands commonly being referred to as elastic bands, rubber bands, or non-elastic bands and also includes any other type of material such as an elastic or a non-elastic string or elastic piece of material, non-elastic piece of material, a round piece of material, a flat piece of material, a ribbon, a piece of paper strip, a piece of plastic strip, a piece of wire, a tie wrap or a twist tie or combinations thereof or any other device capable of gathering the sheet of material to removably or substantially permanently form a crimped portion and secure the crimped portion formed in the sheet of material which may be secured about an object such as the flower pot 90. The band may also include a bow if desired in a particular application. It will be appreciated that such a band may be applied at any level of the outer surface 104 of the decorative cover 88 as it is encompasses the outer peripheral surface 96 of the pot 90, or such a band may be applied to the outer surface 104 of the decorative cover 88 above the level of the pot 90.

It will be appreciated that the application of one or more bands to at least partially secure a sheet of material about a pot to form a decorative cover may be an automatic, mechanical application of the band to the sheet of material and/or pot, as is described in the above-incorporated by reference U.S. Pat. No. 5,105,599.

The Embodiment and Methods of FIGS. 18–21

The sheet of material 11f may be automatically, by mechanical means, formed about a pot 90f into a decorative cover 88f. Alternatively, the sheet of material 11f may be automatically, by mechanical means, formed into a preformed decorative cover 88f, for receiving either a pot 90f or potting soil 108 (or other growing medium) and a potted plant.

A modified sheet of material 11f, identical to the sheet of material 11 shown in FIGS. 1 and 2 and described in detail previously is provided. To cover the a pot 90f, the sheet of material 11f is automatically formed about the outer peripheral surface 96f of the pot 90f. Alternatively, the sheet of material 11f may be formed into a preformed decorative cover 88f which is then disposed about the outer peripheral surface 96f of the pot 90f or potted plant. Such decorative covers 88f are illustrated in FIGS. 18–21.

Figures 19, 20, 21, 22:
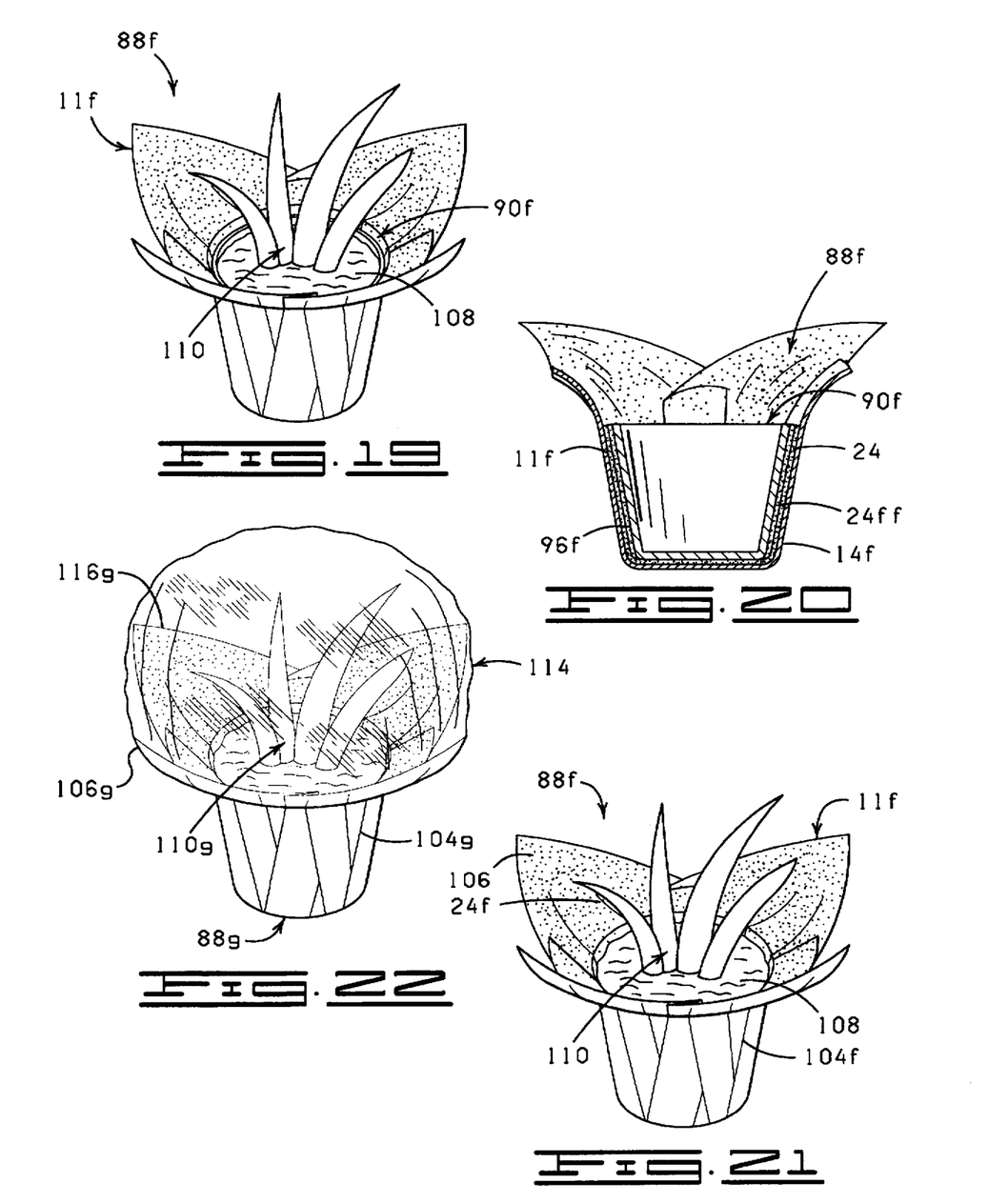
FIG. 19 is a perspective view of the preformed decorative cover of FIG. 18, but showing a pot disposed therein, the pot having potting soil and a potted plant disposed therein.
FIG. 20 is a side elevational view of the decorative cover and pot of FIG. 19, but showing the pot having a bonding material on the outer peripheral surface thereof disposed in the decorative cover, and pot having no potting soil or potted plant disposed therein.
FIG. 21 is a perspective view of the decorative cover, potting soil and potted plant of FIG. 19, but showing the potting soil and potted plant being disposed directly in the decorative cover without a pot.
FIG. 22 is a perspective view of a preformed decorative cover having a pot disposed therein, the pot having potting soil and a potted plant disposed therein, a sleeve portion being connected to the decorative cover and extending in a bubble-type manner over the decorative cover and the potted plant.

It will be appreciated that the decorative cover 88f, once formed, may have the same characteristics and described elements of the pot as previously described, and may substitute, i.e., act as a container or flexible pot for a floral grouping 58f or potted plant (FIG. 21).

Figure 18:
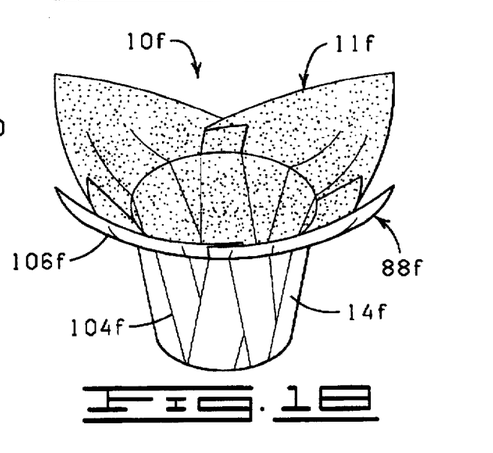
FIG. 18 is a perspective view of a preformed decorative cover formed from the wrapping material of FIGS. 1-2.

In a method of use (FIGS. 18–19), the sheet of material 11e is provided and is preformed into a decorative cover 88e as shown in FIG. 18. The decorative cover 88f is generally self-supporting by virtue of overlapping folds 86f which are bonded to each other or which are bonded to adjacent overlapping folds 86f, either of which form a somewhat rigid structure (the structure being "rigid" only in the sense that if it is compressed by flattening, the structure continues to retain memory of its pre-formed shape, and will return to its pre-formed shape easily when un-flattened), or by pleated folds, or other folds, which are set into the sheet of material 11f during the preforming process, which also form a rigid, as defined above, structure.

One method for forming such a preformed decorative cover 88f (also termed "preformed plant cover" or "pot cover") by using overlapping folds is shown in U.S. Pat. No. 4,773,182 entitled "Article Forming System" issued to Weder et al., on Sep. 27, 1988, which is hereby incorporated herein by reference. Another method for forming a preformed decorative cover using a flat paneled pleating method is shown in U.S. Pat. No. 5,254,072 entitled "Flat Paneled Flower Pot Or Flower Pot Cover" issued to Weder et al., on Oct. 19, 1993, which is hereby incorporated by reference herein. Still another method of forming a preformed decorative cover by gathering excess material together into fins is disclosed in U.S. Pat. No. 5,221,248 entitled "Flower Pot Or Flower Pot Cover With Fins" issued to Weder et al., on Jun. 22, 1993 and U.S. Pat. No. 5,286,247 entitled "Flower Pot Or Flower Pot Cover With Fins" issued to Weder et al., on Feb. 15, 1994, both of which are hereby incorporated by reference herein. Another method for forming non-shape sustaining material, such as cloth, natural or synthetic fiber, burlap, or other non-shape sustaining material into a preformed decorative cover is both illustrated and described in detail in U.S. Pat. No. 5,076,874 entitled "Process For Forming a Paper, Burlap or Cloth Flower Pot Cover" issued to Weder on Dec. 31, 1991, U.S. Pat. No. 5,120,382 entitled "Process For Forming a Paper, Burlap or Cloth Flower Pot Cover" issued to Weder on Jun. 9, 1992, and U.S. Pat. No. 5,156,702 entitled "A Process For Forming a Paper, Burlap or Cloth Flower Pot Cover" issued to Weder on Oct. 20, 1992, all of which are hereby incorporated by reference herein. A method for forming a sheet of material about a flower pot for forming a decorative cover is shown and described in detail in U.S. Pat. No. 4,733,521 entitled "Cover Forming Apparatus" issued to Weder et al. on Mar. 29, 1988, which is hereby incorporated by reference herein. A method of forming a decorative cover by automatically disposing a band about a sheet of material formed about a flower pot is illustrated and described in U.S. Pat. No. 5,105,599, issued to Weder on Apr. 21, 1992, entitled, "Means For Securing a Decorative Cover About a Flower Pot".

A floral grouping 58f disposed in potting soil 108f or other growing medium in a pot 90f or a potted plant 110 may be provided, and the preformed decorative cover 88f may then be used to cover such a flower pot 90f containing a floral grouping 58f (not shown) or potted plant 110. The lower end 94f of the pot 90f is disposed in the opening formed in the decorative cover 88f, the decorative cover 88f thereby covering a substantial portion of the outer peripheral surface 96f of the pot 90f. It will be appreciated that a pot 90f having a bonding material 24ff on at least a portion of the outer peripheral surface 96f may be used (FIG. 20), to either form the decorative cover 88f thereabout, or to connect the preformed decorative cover 88f to the pot, or to accomplish both purposes. Further, as described previously, the decorative cover 88f may, in some instances, according to the types of materials and the thickness of the materials utilized to form the decorative cover 88f, be used as a pot or container itself (FIG. 21).

The term "potted plant" is used herein means a plant having a bloom or foliage portion and a stem portion as well as a root portion (not shown), the root portion disposed in a potting soil 108 or a growing medium. The term "potted plant" is used herein and also includes botanical items and propagules. The term "botanical item" when used herein means a natural or artificial herbaceous or woody plant, taken singly or in combination. The term "botanical item" also means any portion or portions of natural or artificial herbaceous or woody plants including stems, leaves, flowers, blossoms, buds, blooms, cones, or roots, taken singly or in combination, or in groupings of such portions such as a bouquet or floral grouping.

The term "propagule" when used herein means any structure capable of being propagated or acting as an agent of reproduction including seeds, shoots, stems, runners, tubers, plants, leaves, roots or spores.

The term "growing medium" when used herein means any liquid, solid, or gaseous material used for plant growth before the cultivation of propagules, including organic and inorganic materials such as soil, humus, perlite, vermiculite, sand, water, and including the nutrients, fertilizers or hormones, or combinations thereof required by the plant or propagule for growth.

The Embodiments and Methods of FIG. 22

The preformed decorative cover 88g may also have a sleeve portion 114 which extends upwards a distance above the decorative cover 88g, and which may form a portion of the decorative cover 88g which may be detached, or which forms a separate sheet of material which may be removably connected to the decorative cover 88g.

FIG. 22 illustrates a sleeve portion 114 which forms a portion of the decorative cover 88g. The sleeve portion 114 extends upward from the skirt 106g. Sleeve perforations 116 are formed along the skirt 106g to permit the sleeve portion 114 to separated and removed from the skirt 106g. It will be appreciated, however, that the sleeve portion 114 may be formed from a separate sheet of material 11g and connected via any means or device described herein and/or known in the art to any portion of the decorative cover 88g. The sleeve portion 114 may be gathered or crimped somewhat at the upper-most section of the sleeve portion 114 (not shown). A tie (not shown) or a handle (not shown) may form a portion of the sleeve portion 114 and be used to connect the upper-most section of the sleeve portion 114 together. Such a tie or handle may be provided to assist in picking up the decorative cover 88g, especially when the decorative cover 88g comprises a pot 90g and/or a floral grouping 58g.

In another alternative (not shown), the sleeve portion 114 may be formed from a separate sheet of material 11g which is connected to the outer surface 104g of the decorative cover 88g. Such a connection may be formed by crimping, by bonding material, or by any means or device described herein and/or known in the art. The sleeve portion 114 of this embodiment extends a distance upward and away from the decorative cover 88g. The sleeve portion 114 may be gathered or have a tie or handle, as described above. In yet a further alternative, the sleeve portion 114 may be connected to at least a portion of the inner surface of the decorative cover 88g (not shown).

Figure 23:
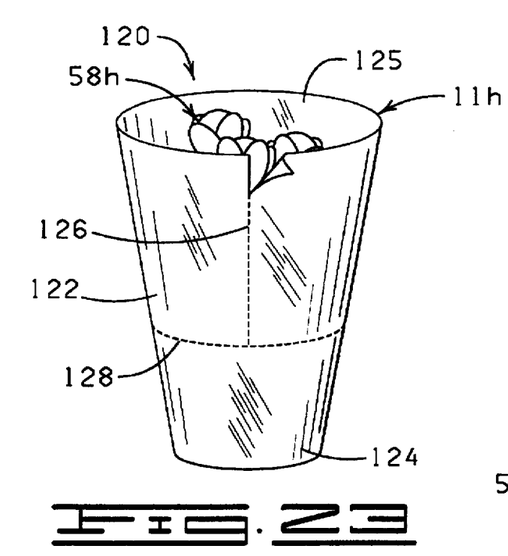
FIG. 23 is a perspective view of a pot sleeve which surrounds a pot having a floral grouping therein, the pot sleeve having vertical perforations and circumferential perforations, a portion of the vertical perforations being torn open.
Figure 24:
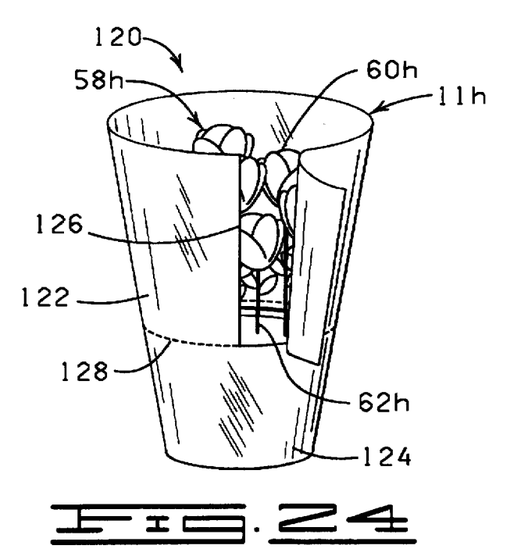
FIG. 24 is a perspective view of the pot sleeve, pot and floral grouping of FIG. 23, but showing the vertical perforations torn open and a portion of the circumferential perforations being torn away.
Figure 25:
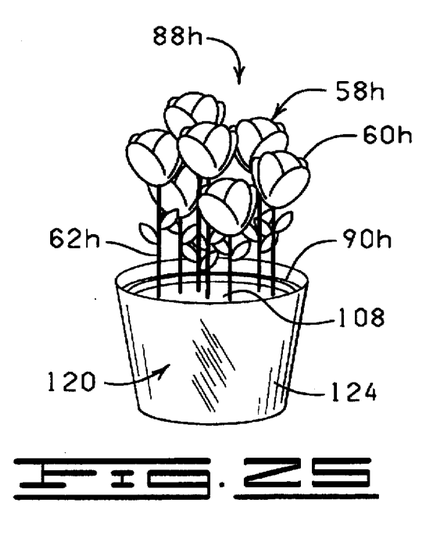
FIG. 25 is a perspective view of the pot sleeve, pot and floral grouping of FIGS. 23-24, but showing the upper portion of the pot sleeve being torn away, the lower portion forming a decorative cover about the pot.

The Embodiments and Methods of FIGS. 23–25

As illustrated in FIGS. 23–25, a pot sleeve 120 may also extend over the outer peripheral surface 96h of a pot 90h, or a decorative cover (not shown). The pot sleeve 120 comprises an upper portion 122 and a lower portion 124 with an opening 125 intersecting at least the upper portion 122 and extending through, at times, the lower portion 124. The pot sleeve 120 further comprises vertical perforations 126 and/ or circumferential perforations 128. The pot sleeve 120 may comprise at least a portion of a decorative cover 88h if at least a portion of the upper portion 122 of the pot sleeve 120 tears away from the lower portion 124 of the pot sleeve 120 via vertical perforations 126 and/or circumferential perforations 128 extending about the pot sleeve 120 near or above the level of the open upper end 92h of the pot 90h, as illustrated in FIGS. 23–25) or, alternatively, the pot sleeve 120 may extend over a pot 90h already covered by a decorative cover 88h, the pot sleeve 120 often being torn away from at least a portion of the decorative cover 88h after shipment and delivery (not shown). The pot sleeve 120 usually has a bonding material 24h disposed thereupon such that the lower portion 124 of the pot sleeve 120 adjacent the outer peripheral surface 96h of the pot 90h will align with and connect to the pot 90h (the outer peripheral surface 96h of the pot having a bonding material 24h thereon as well). Alternatively, the bonding material 24h may be connected to portions of itself, when the pot sleeve 120 is crimped or in any way folded upon itself so that like portions of bonding material 24h contact and connect together (not shown) thereby holding the pot sleeve 120 about the pot 90h. The pot 90h may contain a floral grouping 58h. It will be appreciated that the method of disposing a flower pot 90h into the pot sleeve 120 is generally substantially similar to the method described above for disposing a floral grouping into a sleeve, or a flower pot into a decorative covering. In a method of use, a pot 90h with or without a decorative covering 88h is provided, as is a pot sleeve 120. The closed lower end 94h of the pot 90h is inserted into the opening 125 intersecting the upper portion 122 of the pot sleeve 120. The outer peripheral surface 96h of the pot 90h is usually disposed adjacent the lower portion 124 of the pot sleeve 120, permitting any floral grouping 58h disposed in the pot 90h to be adjacent the upper portion 122 of the pot sleeve 120.

Changes may be made in the construction and the operation of the various components, elements and assemblies described herein or in the steps where the sequence of steps of methods described herein without the parting from the spirit and the scope of the invention as defined in the following claims.

What is claimed is:

1. A plant package, comprising:

a floral grouping comprising a bloom portion and a stem portion;

a sheet of material comprising a sleeve having a first end, a second end, and an outer peripheral surface, an opening intersecting at least the first end forming a retaining space, the sleeve further comprising a bonding material comprising a cold seal adhesive, said cold seal adhesive bonding only to itself, said cold seal adhesive being substantially nonreleasable, wherein a floral grouping is inserted into the opening in the sleeve, said floral grouping being retained in the retaining space, said sleeve being crimped, causing overlapping of at least one portion of the sleeve having bonding material thereon with at least one other portion of the sleeve having bonding material thereon, the bonding material on each overlapped portion adjacent to and in bonding engagement with the bonding material on at least one other overlapped portion to form bonded portions, said bonded portions being formed only when one bonding material contacts and connects in a bonding engagement with at least one other bonding material said bonded portions forming a wrapper about the floral grouping, the floral grouping being substantially surrounded and encompassed by the wrapper, wherein the bonded portions of the wrapper are substantially nonreleasable, and wherein the wrapper is releasable from the floral grouping only by tearing the wrapper away from the floral grouping.

2. The plant package of claim 1 wherein the sleeve further comprises a first end near the bloom portion of the floral grouping and a second end near the stem portion of the floral grouping.

3. The plant package of claim 2 wherein the second end of the sleeve is closed.

4. The plant package of claim 2 wherein the stem portion of floral grouping extends through the second end of the sleeve.

5. A method of wrapping a floral grouping, comprising:

providing a floral grouping having a bloom portion and a stem portion;

providing a sleeve having an a first end, a second end, and an outer peripheral surface, an opening intersecting at least the first end forming a retaining space, the sleeve further comprising a bonding material comprising a cold seal adhesive, said cold seal adhesive bonding only to itself, said cold seal adhesive being substantially nonreleasable;

disposing at least a portion of the floral grouping through the opening in the first end of the sleeve and into the retaining space;

crimping at least a portion of the sleeve about the floral grouping, thereby causing at least one portion of the sleeve having bonding material thereon to overlap at least one other portion of the sleeve having bonding material thereon, said crimping connecting the bonding material to form bonded portions by contacting and connecting the bonding material on one portion of the sleeve to the bonding material on at least one other portion of the sleeve, thereby creating a bonding engagement and bonded portions, said bonded portions being formed only when one bonding material contacts and connects in a bonding engagement with at least one other bonding material, said bonded portions forming a wrapper about the floral grouping, the floral grouping being substantially surrounded and encompassed by the wrapper; and tearing the wrapper away from the floral grouping thereby releasing the floral grouping.

6. The method of claim 5 wherein in the step of providing a sleeve the second end of the sleeve is closed.

7. The method of claim 5 wherein in the step of disposing the floral grouping the stem portion of the floral grouping extends through the second end of the sleeve.

8. A wrapper for wrapping a floral grouping, comprising:

a sleeve having an a first end, a second end, and an outer peripheral surface, an opening intersecting at least the first end forming a retaining space, the sleeve further comprising a bonding material comprising a cold seal adhesive, said cold seal adhesive bonding only to itself, said cold seal adhesive being substantially nonreleasable; and wherein a floral grouping is disposable into the opening in the sleeve, said floral grouping being retained in the retaining space, said sleeve being crimpable, causing overlapping of at least one portion of the sleeve having bonding material thereon with at least one other portion of the sleeve having bonding material thereon, the bonding material on each overlapped portion adjacent to and in bonding engagement with the bonding material on at least one other overlapped portion to form bonded portions, said bonded portions being formed only when one bonding material contacts and connects in a bonding engagement with at least one other bonding material said bonded portions forming a crimped sleeve about the floral grouping, the floral grouping being substantially surrounded and encompassed by the crimped sleeve.

9. The wrapper of claim 8 wherein the second end is closed.

10. The wrapper of claim 8 wherein the stem portion of floral grouping extends through the second end.

11. A method of wrapping a floral grouping, comprising:

providing a floral grouping having a bloom portion and a stem portion;

providing a sleeve having an a first end, a second end, and an outer peripheral surface, an opening intersecting at least the first end forming a retaining space, the sleeve further comprising a bonding material comprising a cold seal adhesive, said cold seal adhesive bonding only to itself, said cold seal adhesive being substantially nonreleasable;

disposing at least a portion of the floral grouping through the opening in the first end of the sleeve and into the retaining space; and crimping at least a portion of the sleeve about the floral grouping, thereby causing at least one portion of the sleeve having bonding material thereon to overlap at least one other portion of the sleeve having bonding material thereon forming bonded portions in the sleeve, said bonded portions being formed only when one bonding material contacts and connects in a bonding engagement with at least one other bonding material, said bonded portions forming a crimped area about the floral grouping, the floral grouping being substantially surrounded and encompassed by the sleeve.

12. The method of claim 11 wherein in the step of providing the sleeve the second end is closed.

13. The method of claim 11 wherein in the disposing step the stem portion of the floral grouping extends through the second end of the sleeve.

* * * * *

UNITED STATES PATENT AND TRADEMARK OFFICE
CERTIFICATE OF CORRECTION

PATENT NO. : 5,664,675

DATED : September 9, 1997

INVENTOR(S) : Donald E. Weder

It is certified that error appears in the above-identified patent and that said Letters Patent is hereby corrected as shown below:

Column 1, lines 8-14, please delete "METHOD AND APPARATUS FOR COVERING PORTIONS OF AN OBJECT WITH A SHEET OF MATERIAL HAVING A PRESSURE SENSITIVE ADHESIVE COATING APPLIED TO AT LEAST ONE SURFACE OF THE SHEET OF MATERIAL OR COHESIVE MATERIAL APPLIED THERETO", and substitute therefor --METHOD OF COVERING A POT--.

Column 1, lines 19-23, please delete "METHOD AND APPARATUS FOR COVERING PORTIONS OF AN OBJECT WITH A SHEET OF MATERIAL HAVING A PRESSURE SENSITIVE ADHESIVE COATING APPLIED TO AT LEAST ONE SURFACE OF THE SHEET OF MATERIAL", and substitute therefor --METHOD FOR WRAPPING AN OBJECT WITH AN EMBOSSED MATERIAL HAVING AN ADHESIVE THEREON--.

Column 8, line 4, after 'floral grouping 58', please delete "(FIG. 8)", and substitute therefor --(FIGS. 7 and 8)--.

Column 9, line 37, after 'surface', please delete "82", and substitute therefor --78d--.

Column 10, line 25, after 'crimped', please delete "6".

UNITED STATES PATENT AND TRADEMARK OFFICE
CERTIFICATE OF CORRECTION

PATENT NO. : 5,664,675
DATED : September 9, 1997
INVENTOR(S) : Donald E. Weder

It is certified that error appears in the above-identified patent and that said Letters Patent is hereby corrected as shown below:

Column 10, line 54, please delete "240", and substitute therefor --86--.

Column 10, line 63, please delete "24f", and substitute therefor --24d--.

Column 12, line 5, please delete "74", and substitute therefor --90--.

Column 12, line 6, after 'decorative cover', please delete "72", and substitute therefor --88--.

Column 12, line 6, after 'pot', please delete "74", and substitute therefor --90--.

Column 14, line 33, after 'perforations', please delete "116", and substitute therefor --116g--.

Signed and Sealed this

Fifteenth Day of December, 1998

Attest:

BRUCE LEHMAN

Attesting Officer

Commissioner of Patents and Trademarks